United States Patent [19]

Dorn et al.

[11] 3,774,208

[45] Nov. 20, 1973

[54] NARROW BAND FREQUENCY MODULATED JAMMER

[75] Inventors: Clifford G. Dorn; John R. Padilla, both of Riverside, Calif.

[73] Assignee: The United States of America as represented by the Secretary of the Navy, Washington, D.C.

[22] Filed: Oct. 24, 1968

[21] Appl. No.: 770,454

[52] U.S. Cl. ................................ 343/18 E, 325/132

[51] Int. Cl. ................................ H04k 3/00

[58] Field of Search ...................... 343/18 E; 331/78; 332/6; 325/132

[56] References Cited

UNITED STATES PATENTS

| | | | |
|---|---|---|---|
| 3,038,067 | 6/1962 | Dench et al. | 325/132 X |
| 2,416,307 | 2/1947 | Grieg | 331/78 X |
| 2,768,298 | 10/1956 | Hendrix et al. | 331/78 X |
| 2,997,662 | 8/1961 | Garner et al. | 331/78 |

OTHER PUBLICATIONS

Holahan, Tools and Techniques at Electronic Warfare, April, 1960, pp. 126, 128–131.

*Primary Examiner*—T. H. Tubbesing
*Attorney*—E. J. Brower, J. M. St. Amand and T. M. Phillips

[57] ABSTRACT

A narrow band frequency modulated jamming device comprising a noise source, a low-pass filter, an amplifier and a traveling-wave tube capable of being modulated by the application of a signal to the helix thereof. Said low-pass filter is coupled to the noise source and removes or suppresses all generated frequencies above 500 Hz. The output terminal of said filter is connected to the amplifer which in turn is coupled to the helix of the traveling-wave tube. The gain control of the amplifier is adjusted so that a predetermined level of noise voltage is applied to the helix of the traveling-wave tube. This narrow bandwidth of noise serves to modulate the input signal to the traveling-wave tube. Said modulated input signal is then retransmitted as a jamming signal having a very narrow RF bandwidth and good carrier suppression.

4 Claims, 3 Drawing Figures

CLIFFORD G. DORN
JOHN R. PADILLA
*INVENTORS*

BY J. M. St. Amand
*ATTORNEYS*

NARROW BAND FREQUENCY MODULATED JAMMER

The invention herein described may be manufactured and used by or for the Government of the United States of America for governmental purposes without the payment of any royalties thereon or therefor.

The present invention relates to a narrow band frequency modulated jamming device. More particularly it relates to a jamming device which utilizes a narrow band of noise frequencies to modulate an air-borne traveling-wave tube that is retransmitting signals received from a missile guidance radar.

Jamming devices commonly known in the prior art utilized sine wave, saw-tooth, or triangular signals for modulation. Further, these prior art devices either were not confined to using a very narrow RF spectral bandwidth or were not used as repeaters for retransmitting a received signal with modulation supplied for jamming. Previous attempts to design a jamming device in which a traveling-wave tube was modulated with noise resulted in a device having an output containing a predominant carrier, that is, a repeat of the input, with the modulation appearing as sidebands on this signal. Such a device was ineffective because it aided in the interception of the vehicle to be protected rather than interfering with it.

An object of the present invention is to provide a narrow band frequency modulated jamming device which makes the target to which it is attached appear as clutter to the system to be jammed.

Another object of the present invention is to provide a jamming device which utilizes a limited bandwidth of noise, applied to the helix of a traveling-wave tube, to modulate the input signal received by said tube and then retransmit said input signal as an output jamming signal characterized by a very narrow RF bandwidth having good carrier suppression.

These objects are accomplished by providing a narrow band frequency modulated jammer comprising a noise source capable of generating a band of noise frequencies from D.C. to several megacycles, a low-pass filter, an amplifier and a traveling-wave tube having an input, a helix, and an output. Said filter is connected in circuit with the noise source and removes or suppresses all generated frequencies above 500 Hz. The output of said filter circuit is connected to the amplifier which in turn is coupled to the helix of the traveling-wave tube. The amplitude of the signal applied to the helix is critical and preset by carefully adjusting the gain control of said amplifier. The input to the traveling wave tube is modulated by the narrow bandwidth of noise applied to the helix and retransmitted at the output of said traveling-wave tube. The resultant output is characterized by a very narrow RF bandwidth and good carrier suppression.

Other objects and many of the attendant advantages of this invention will become readily appreciated as the same becomes better understood by reference to the following detailed description when considered in connection with the accompanying drawings wherein.

Figure 1:
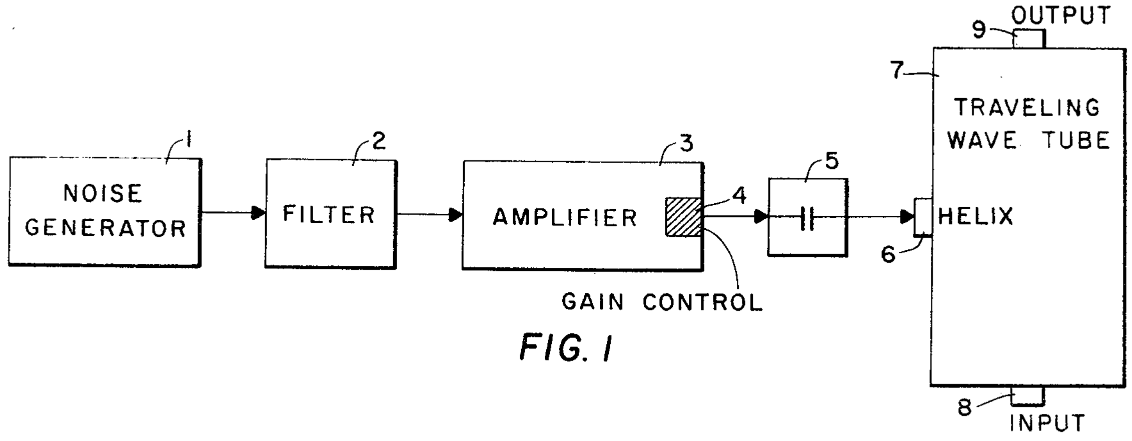
FIG. 1 is a block diagram showing the narrow band frequency modulated jamming device of the present invention.

Referring to FIG. 1, the narrow band frequency modulated jamming device of the present invention comprises in circuit a noise generator 1, a low-pass filter 2, an amplifier 3 having an adjustable gain control 4 and a traveling-wave tube 7. Said traveling-wave tube 7 may be of the type XA 600—20 manufactured by Keltec Florida, Fort Walton Beach, Florida, having an input means 8, an output means 9 and a helix 6.

The noise generator 1 is connected in circuit to the low-pass filter 2 which in turn is connected to the amplifier 3. The output side of the amplifier 3 is coupled to the helix 6 of the traveling-wave tube 7 through a blocking capacitor 5.

In operation, the noise generator 1 generates a band of noise frequencies from D.C. to several megacycles. This band of noise frequencies is passed through the low-pass filter 2 where all frequencies above 500 Hz are removed or suppressed. Said low-pass filter 2 can be either of the active or passive type; however, one filter type which has been found operable is type No. 420—56—0031 manufactured by Acme Electronics, Cuba, New York. The output of the filter is then amplified in the variable gain amplifier 3. The gain of this amplifier 3, which is critical to the effective operation of the present invention, is adjusted by means of the gain control 4. The output of the amplifier 3 is fed to capacitor 5 where the direct current component is blocked out and then applied to the helix 6 of the traveling wave tube 7. The transmitted signal received at the input receiving means 8 of the traveling-wave tube 7 is modulated by the noise signal applied to the helix 6 and retransmitted in the form of a jamming signal having a very narrow RF bandwidth with good carrier suppression at the output transmitting means 9.

Figure 2:
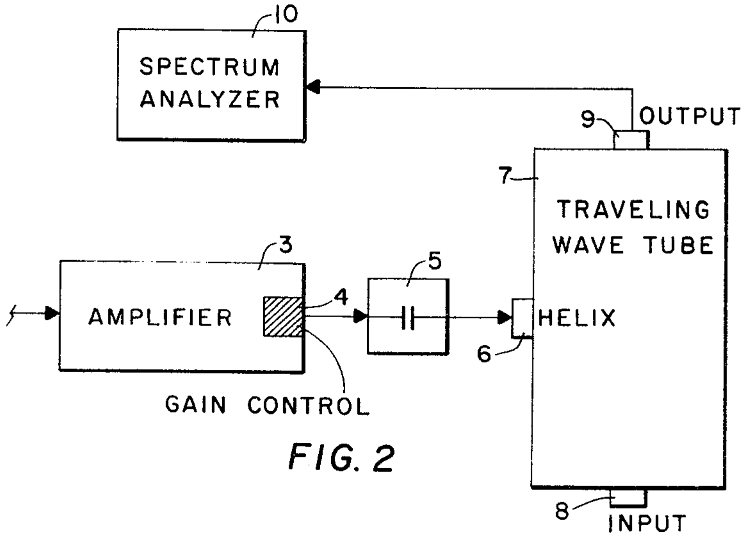
FIG. 2 is a block diagram showing a method of instrumentation for setting the effective gain of the amplifier shown in the embodiment of FIG. 1.

The gain control 4 of the amplifier 3 must be carefully adjusted so that a predetermined voltage is applied to the helix 6 of the traveling-wave tube 7. This voltage is that voltage necessary to shift the phase of the output signal of the traveling-wave tube 7 by approximately 360° from what it would have been if modulation were not being applied to the helix 6. Referring to FIG. 2, the proper voltage level may be determined by connecting a spectrum analyzer 10 to the output 9 of the traveling-wave tube 7 and adjusting the gain control 4 while observing the RF spectrum of output on the spectrum analyzer 10. The gain control 4 should be adjusted until the carrier, that is, until the repeat of the input signal, disappears and only the signals produced by the modulation are present in the display on the spectrum analyses 10.

Figure 3:
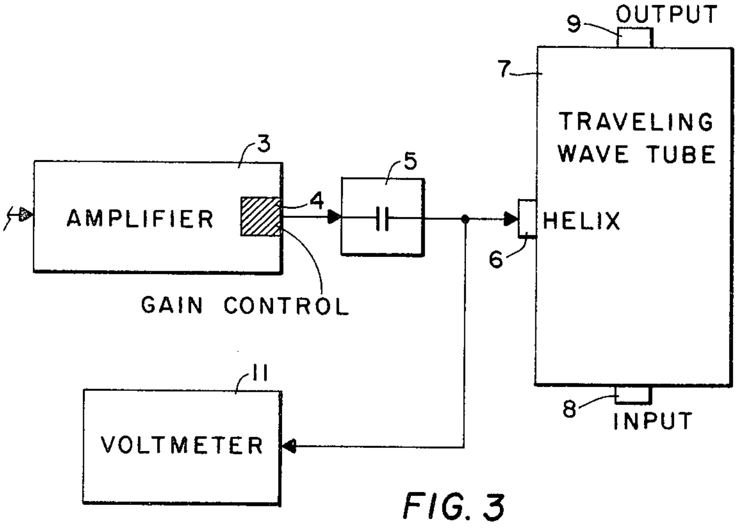
FIG. 3 is a block diagram showing an alternate method of instrumentation for setting the effective gain of the amplifier shown in the embodiment of FIG. 1.

The gain control 4 can also be adjusted by attaching a vacuum tube voltmeter 11 between the capacitor 5 and the helix 6 of the traveling-wave tube 7, as shown in FIG. 3, and adjusting the gain control 4 until the proper predetermined voltage is indicated on the voltmeter 11. This predetermined voltage is that voltage necessary to produce a 360° phase shift in the output of the traveling-wave tube 7 and may be determined from the traveling-wave tube characteristics either as published by the manufacturer or as determined by previous tests.

This invention can be made with any type noise source 1 having the required frequency components from direct current to 500 Hz and the only limitations on the traveling-wave tube 7 are that it have enough output power to jam a missile and that it is capable of being modulated by a signal applied to its helix 6. Any amplifier 3 having sufficient output power to drive a traveling-wave tube and sufficient gain to modulate the received input signal can be used. One such amplifier is obtained by applying the power considerations described at page 316 of "Solid-State Communication" by Texas Instruments, Inc., McGraw-Hill, New York, 1966, to the amplifier circuit described at page 142 of the article "The Junction Transistor and its Application" by E. Wolfendale, Macmillan Co., New York, 1958.

What is claimed is:

1. A narrow band frequency modulated jamming device comprising:

a. a noise source generating means for generating a noise frequency, b. a low-pass filter connected in circuit to the output of said noise source generating means for removal of all frequencies above 500 Hz, c. a variable gain amplifier connected in circuit to the output side of said low-pass filter, the gain of said amplifier being adjusted to produce a predetermined narrow bandwidth of noise and d. a traveling-wave tube, having an input receiving means, an output transmitting means and a helix, said traveling-wave tube being coupled at the helix via a capacitor to the output side of said variable gain amplifier, said capacitor blocking any D.C. component of said variable gain amplifier, the gain of said amplifier having critical gain control adjustment for applying a predetermined modulation voltage to said helix required to shift the phase of the output signal of the traveling-wave tube by approximately 360° from what it would be if modulation were not applied to the helix, said gain control being adjusted until the repeat of the input signal disappears and only signals produced by the modulation are present, e. said traveling-wave tube utilizing a narrow band of the noise frequency generated by said noise generator means to modulate the input signal received on the input receiving means of said traveling-wave tube for retransmission as a jamming signal, the output transmitting means of the traveling-wave tube being characterized by a very narrow RF bandwidth and good carrier suppression, wherein the jamming device appears as clutter to a system being jammed.

2. A narrow band frequency modulated jamming device as claimed in claim 1 wherein said low-pass filter has a pass band between direct current and 500 Hz.

3. A method of jamming active and semi-active missiles of the type vulnerable to narrow band F.M. jamming by retransmitting a signal received on a traveling-wave tube, having input receiving means, output transmitting means and a helix, after modulating it with a narrow band of low frequency noise containing no repeat of the input signal applied to the helix of the traveling-wave tube at that voltage level which shifts the phase of the signal at the output transmitting means of the traveling-wave tube by approximately 360° from what it would have been if modulation were not applied at the helix of the traveling-wave tube and which appears as clutter to the missile being jammed.

4. A method of jamming as claimed in claim 3 wherein said narrow band of low frequency noise has a pass band from direct current to 500 Hz.

* * * * *